(12) United States Patent
Amin et al.

(10) Patent No.: US 6,184,184 B1
(45) Date of Patent: Feb. 6, 2001

(54) ENCAPSULATED BREAKER FOR OIL GEL SYSTEM

(75) Inventors: Junad Amin; Satyanarayana Gupta, both of Calgary (CA)

(73) Assignee: Fracmaster Ltd. (CA)

(*) Notice: Under 35 U.S.C. 154(b), the term of this patent shall be extended for 0 days.

(21) Appl. No.: 09/197,845

(22) Filed: Nov. 23, 1998

(30) Foreign Application Priority Data

Nov. 25, 1997 (CA) .................................................. 2222087

(51) Int. Cl.$^7$ ...................................................... C09K 3/00
(52) U.S. Cl. ................... 507/238; 507/269; 507/921; 507/902
(58) Field of Search .................................. 507/237, 238, 507/269, 921, 902

(56) References Cited

U.S. PATENT DOCUMENTS

| | | | |
|---|---|---|---|
| 4,506,734 | * 3/1985 | Nolte | 166/308 |
| 4,741,401 | * 5/1988 | Walles et al. | 507/921 |
| 4,787,994 | 11/1988 | Thorne et al. | |
| 4,919,209 | * 4/1990 | King | 507/238 |
| 5,164,099 | * 11/1992 | Gupta et al. | 507/921 |
| 5,624,886 | 4/1997 | Dawson et al. | |
| 5,649,596 | * 7/1997 | Jones et al. | 507/231 |
| 5,948,735 | * 9/1999 | Newlove et al. | 507/238 |

FOREIGN PATENT DOCUMENTS 2237383  5/1998 (CA) .

* cited by examiner

Primary Examiner—Philip Tucker
(74) Attorney, Agent, or Firm—Lerner, David, Littenberg, Krumholz & Mentlik, LLP

(57) ABSTRACT

An encapsulated breaker for a fracturing fluid for use in fracturing subterranean formations comprising: a hydrocarbon base; neutralized alkyl phosphate esters completed with metallic cations, to form a gel, in said hydrocarbon base.

5 Claims, 1 Drawing Sheet

ENCAPSULATED BREAKER FOR OIL GEL SYSTEM

FIELD OF THE INVENTION

The present invention relates to methods and compositions for fracturing subterranean formations. In particular, the present invention describes a novel encapsulated breaker for use with a fracturing fluid such as those described in co-pending Canadian patent application No. 2,237,383.

BACKGROUND OF THE INVENTION

In order to increase the productivity of oil and gas wells, or to bring back into production wells that have essentially gone dry, it is common practice to conduct a procedure known as fracturing the well. In such a procedure, fluids known as fracturing fluids, are injected into the well at very high hydrostatic pressures. The fluids are typically viscous gels, and act under pressure to open pores and cracks in the formation, thereby to increase the overall permeability of the well. Typically, the fluids also are used to transport proppants, such as sand or ground walnut shells into the cracks and pores, thereby to ensure that the pores and cracks formed during fracturing remain open under the lower pressures that will exist after fracturing, when the well is producing.

The fluid that has been used to fracture the formation is removed by the introduction of viscosity lowering agents into same, which permit the fluid to be more easily pumped from the formation. These agents are known as breakers because they tend to break down the fracturing gel. Breakers can act on a gel in a number of ways, such as by the random oxidation of polymers to shorten the chain length thereof. In the present invention, a breaker is utilized to adjust the pH of a gel, to break same by hydrolysis.

The fracturing fluid of the present invention is a phosphate alkyl ester gel. It is known that a gel can be produced by mixing trivalent cations, such as aluminum, with a phosphate alkyl ester. However, gels obtained with known phosphate alkyl esters have not been commercially acceptable, because the viscosity developed with same has been insufficient or slow to develop, and usually required tank mixing.

Phosphate alkyl esters may be mono-esters, di-esters or trimesters. In the mono-ester, one primary mono-hydric alcohol, of $C_5$–$C_{16}$ length is ester linked to a phosphate. A di-ester has two such alkyl alcohols linked to a phosphate. A tri-ester has three alkyl alcohols linked to it. The applicants have discovered that commercially valuable gels are feasible with a di-ester content above 50%, preferably above 65%, and a tri-ester content below 5%. The remainder may be mono-ester.

The applicants enhance gel development in two important ways. First, the phosphal alkyl esters are neutralized with primary amines. Secondly, the applicants utilize a surfactant to enhance gel development. An appropriate surfactant is ammonium alkyl ($C_6$–$C_{20}$) sulfate.

In order to break the gel described herein the preferred breaker of the present invention is a pH adjusting breaker, such as calcium oxide and sodium carbonate. It is preferred that the breaker be encapsulated in a porous inert substance, such as nylon.

In a broad aspect, then, the present invention relates to an encapsulated breaker for a fracturing fluid for use in fracturing subterranean formations comprising: a hydrocarbon base; and neutralized alkyl phosphate esters complexed with metallic cations, to form a gel, in said hydrocarbon base.

BRIEF DESCRIPTION OF THE DRAWING

In drawings that illustrate the present invention by way of example.

DETAILED DESCRIPTION

Figure 1:
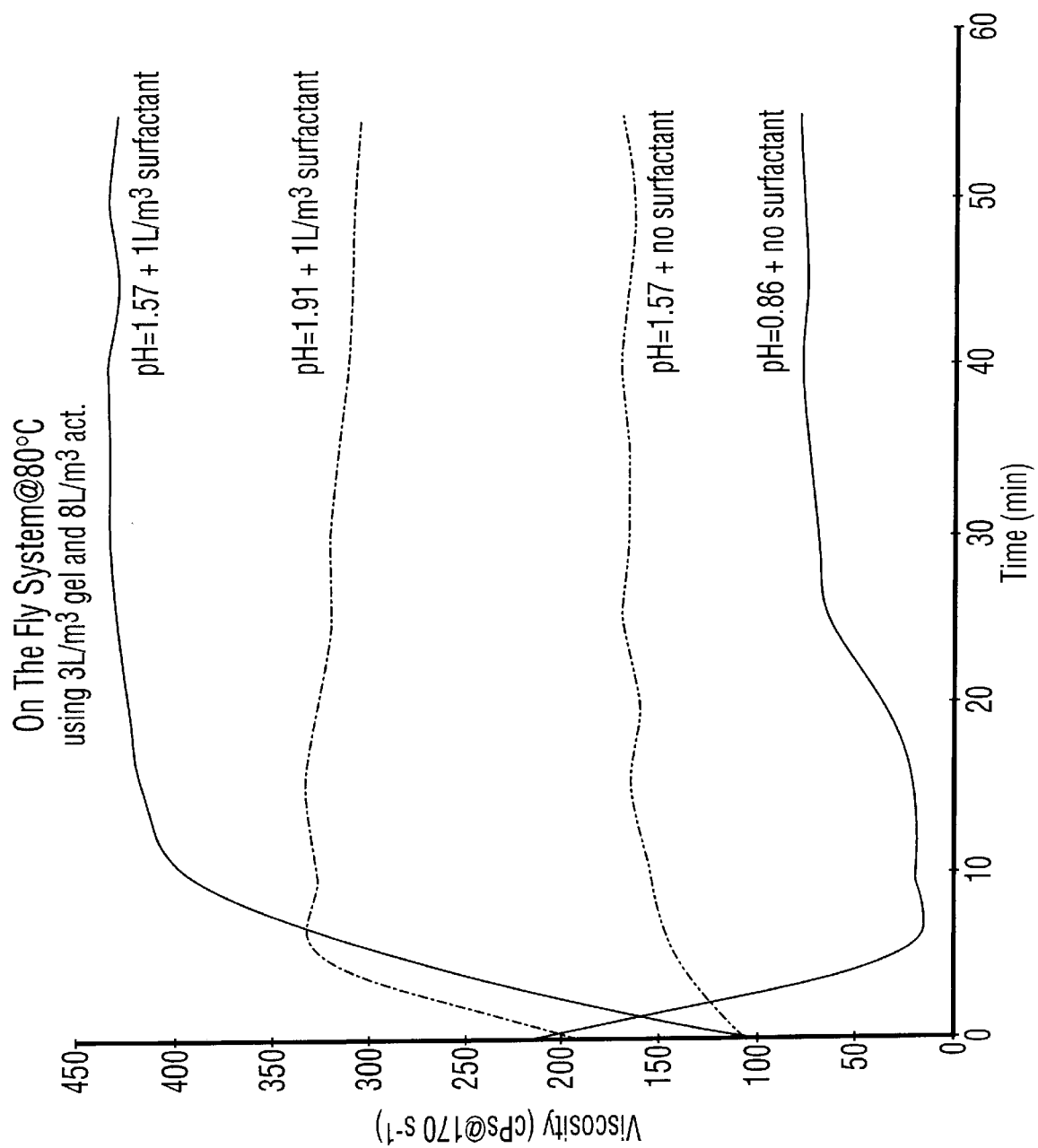
FIG. 1 is a graph illustrating the effect of pH and surfactant on the phosphate alkyl ester gels of the present invention.

The phosphate ester gels of the present invention are made from primary mono-hydric alcohols of $C_5$–$C_{16}$ chain length. It is preferred to utilize alcohols of chain length $C_8$–$C_{12}$, but it will be understood that since the gels of the present invention are intended to act on hydrocarbon fluids, such as diesel fuel, kerosene, or other common hydrocarbon fluids, the selection of an optimal chain length alcohol will be a matter of choice for one skilled in the art. The alkyl alcohols are combined with phosphates, by known techniques to produce mono-di and tri-alkyl esters which may generally be represented as follows:

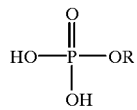

mono-alkyl phosphate ester

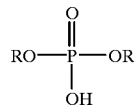

di-alkyl phosphate ester

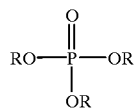

tri-alkyl phosphate ester

The relative proportions of mono-alkyl, di-alkyl and tri-alkyl esters are important. The applicant has discovered that the di-alkyl phosphate ester content must be at least 50% for any gel development to occur, and must be at least 65% for commercially feasible gel to form. Moreover, tri-alkyl phosphate ester content must be lower than 5%, or poor gel rheological characteristics will result. There must be at least a small percentage of mono-alkyl phosphate ester present to initiate gelling.

Primary amines are used to neutralize esters. The quantity of amine used will, of course depend on the amine. However, a suitable amine is mono-ethanol amine (MEA). From 1% to 5% of a concentrated (99%) MEA solution (relative to the weight of the phosphate alkyl esters) is used to produce a desired level of neutralization (pH) in the esters. A preferred pH is about 1.4–1.8.

The partially neutralized phosphate ester is then mixed in the hydrocarbon fluid to be gelled, with a trivalent cation, either aluminum or ferric. It is, moreover, preferred to utilize chelated ions, since these readily disperse in organic solvents, thereby enhancing the rate of gelation. Examples of suitable compounds are aluminum isopropoxide, aluminum sec-butoxide, oxy-aluminum octoate, and so on.

The phosphate-alkyl esters and cations form a mesh-like network in the hydrocarbon fluid, resulting in a gel. The hypothesized reaction is as follows:

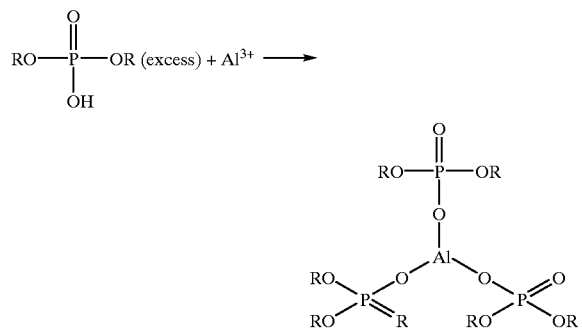

It will be understood that such a network will transform the essentially two dimensional phosphate-alkyl ester to a three dimensional, very viscous gel.

The gelling rate can moreover be greatly enhanced using a surfactant. Sulphates or sulphonate groups provide the necessary alteration of surface chemistry to result in enhancement of reaction rates. Aluminum alkyl ($C_6$–$C_{20}$) sulfate has been found to be an appropriate surfactant.

The effects of partial neutralization and the use of surfactants are illustrated in FIG. 1. In the examples shown in FIG. 1, it can be seen that the lowest viscosity is achieved with an unneutralized gel, and no surfactant. It will be understood that in each case 8 litres per cubic metre diesel oil, of a 70% dialkyl phosphate ester are utilized, with 81/cubic metre of aluminum tri-isopropoxide.

In the example neutralized to a pH of 1.57, resulting viscosity is about doubled, with the use of a surfactant resulting in a further tripling of the achieved viscosity. As shown, if the pH is permitted to rise, viscosity will be lowered somewhat. This information can be utilized, however, to advantage, to design gels with viscosity characteristics to particularly match those desired for fracturing a given formation.

To form a gel in a hydrocarbon solvent according to the present invention, 0.5–1.5% (by weight of hydrocarbon) partially neutralized phosphate alkyl ester are utilized with 0.025–0.2% surfactant and 0.1–1.5% trivalent cation. About 80% of the maximum viscosity of the gel is attained, typically, in the first minute of mixing. The constituents can and advantageously are, therefore, blended "on the fly" as they are pumped into a formation. Aluminum acetate may also be added, to stabilize the gel.

The gel may be broken by the use of pH adjusting breakers, such as soda ash, caustic, lime, amines, and acids.

Particulary preferred breakers are calcium oxide, and calcium peroxide, encapsulated in a particle of about 80–100 mesh size. The breaker is encapsulated by known techniques, such as a fluidized bed process, or interfacial polymerization. The thickness, and permeability, of the membrane of the breaker can be adjusted, by known techniques, to provide any desired release rate of breaker.

The effect of encapsulated calcium oxide breaker, on a gel described herein, is summarized in Table I which follows. The procedure used to generate the date of Table I is as follows:

1. The gellant (OG-14X Gellant) at 0.8 vol. % loading is added to the hydrocarbon fluid (diesel) while stirring at 1200 rpm with a lab stirrer.
2. Activator (OG-14X Activator) at 0.8 vol. % loading is added to the fluid.
3. Mixing speed is increased to 1500 rpm.
4. After 15 sec. mixing (to mimic suction manifold to tub time), the stabilizer (A5) at 0.025 wt % is added followed by the encapsulated breaker of this invention.
5. Mixing speed is increased to 2500 rpm and the fluid is mixed for additional 45 sec.
6. The fluid is placed in the high temp. rheometer (Fann 50) and tested.

The procedure was then repeated, with various concentrations of water present, to simulate various well conditions.

TABLE I

| | SAMPLE | | | | | | | | | | | | | | |
|---|---|---|---|---|---|---|---|---|---|---|---|---|---|---|---|
| | A | | | B | | | C | | | D | | | E | | |
| | $\mu$ | $n^1$ | $K^1$ | $\mu$ | $n^1$ | $K^1$ | $\mu$ | $n^1$ | $K^1$ | $\mu$ | $n^1$ | $K^1$ | $\mu$ | $n^1$ | $K^1$ |
| INITIAL | 278 | 0.25 | 27.12 | 240 | 0.17 | 28.17 | 200 | 0.20 | 23.72 | 164 | 0.14 | 21.55 | 98 | 0.96 | 1.09 |
| AFTER SCAN | 330 | — | — | 245 | — | — | 270 | — | — | 189 | — | — | 120 | — | — |
| 10 min | 435 | 0.17 | 51.95 | 405 | 0.08 | 61.72 | 185 | 0.07 | 31.23 | 200 | 0.02 | 33.3 | 410 | 0.35 | 28.09 |
| 20 min | 440 | 0.15 | 54.58 | 395 | 0.06 | 62.69 | 150 | 0.09 | 22.17 | 135 | 0.11 | 19.58 | 435 | 0.13 | 58.71 |
| 30 min | 440 | 0.13 | 57.76 | 370 | 0.06 | 60.80 | 105 | 0.18 | 11.74 | 95 | 0.23 | 9.77 | 425 | 0.14 | 52.73 |
| max visc. | 445 | — | — | 410 | — | — | 370 | — | — | 280 | — | — | 455 | — | — |
| | SAMPLE | | | | | | | | | | | | | | |
| | F | | | G | | | H | | | I | | | J | | |
| | $\mu$ | $n^1$ | $K^1$ | $\mu$ | $n^1$ | $K^1$ | $\mu$ | $n^1$ | $K^1$ | $\mu$ | $n^1$ | $K^1$ | $\mu$ | $n^1$ | $K^1$ |
| INITIAL | 169 | 0.33 | 13.61 | 190 | 0.22 | 20.78 | 273 | 0.24 | 27.72 | 191 | 0.27 | — | 200 | 0.72 | 5.44 |
| AFTER SCAN | 186 | — | — | 205 | — | — | 378 | — | — | 197 | — | — | 380 | — | — |
| 10 min | 390 | 0.22 | 38.69 | 370 | 0.10 | 53.83 | 255 | 0.12 | 33.15 | 370 | 0.19 | 40.5 | 185 | 0.60 | 6.80 |
| 20 min | 405 | 0.11 | 57.15 | 410 | 0.10 | 59.48 | 120 | 0.22 | 12.08 | 320 | 0.24 | 32.14 | 245 | 0.49 | 11.54 |
| 30 min | 410 | 0.10 | 57.36 | 400 | 0.10 | 59.33 | 55 | 0.44 | 2.79 | 280 | 0.30 | 23.27 | 275 | 0.42 | 17.71 |
| max visc. | 410 | — | — | 410 | — | — | 490 | — | — | 370 | — | — | 430 | — | — |

| SAMPLE | TEMP (° C.) | DESCRIPTION |
|---|---|---|
| A | 80 | No breaker |
| B | 60 | 96-331XO @ 2.0 (No $H_2O$) |

TABLE I-continued

| | | |
|---|---|---|
| C | 60 | 96-331XO @ 2.0 (1% $H_2O$) |
| D | 60 | 96-331XO @ 2.0 (5% $H_2O$) |
| E | 80 | 94-44X @ 3.0 OG Breaker B @ 0.3 *NOIHCB-1 |
| F | 35 | 96-331XO @ 4.0 (0.5% $H_2O$) |
| G | 35 | 96-331XO @ 4.0 (0.5% $H_2O$) |
| H | 80 | 96-331XO @ 2.0 (1.0 $H_2O$) |
| I | 80 | 96-331XO @ 2.0 (No $H_2O$) |
| J | 60 | OG Breaker B @ 2.0 (No $H_2O$) |

P-40 OG-14X Gel @ 8 OG-14X Act @ 8 IHCB-1 @ 0.25 (±)
n' is a unitless constant (power law coefficient)
k' is expressed as $(Pa \cdot s)^n$ for a power law fluid.

It will be appreciated, therefore, that the present invention provides a reliable viscous gel and encapsulated breaker for use with hydrocarbon solvents, which can be broken on a consistent and effective basis.

What is claimed is:

1. A fracturing fluid including an encapsulated breaker for for use in fracturing subterranean formations comprising:
   (a) a hydrocarbon base;
   (b) acidified alkyl phosphate esters complexed with metallic cations, so as to form a gel; and
   (c) an oxide or peroxide breaker which is encapsulated in a porous encapsulant which is inert.

2. The fracturing fluid of claim 1 wherein said encapsulant is nylon.

3. The fracturing fluid of claim 1 wherein said encapsulated breaker has an average particle size of 80 to 100 mesh.

4. The fracturing fluid of claim 1 wherein said acidified alkyl phosphate esters include at least 50% dialkyl phosphate ester content.

5. The fracturing fluid of claim 4 wherein said acidified alkyl phosphate esters include at least about 65% dialkyl phosphate esters.

* * * * *

UNITED STATES PATENT AND TRADEMARK OFFICE
CERTIFICATE OF CORRECTION

PATENT NO.    : 6,184,184 B1
DATED         : February 6, 2001
INVENTOR(S)   : Amin et al.

It is certified that error appears in the above-identified patent and that said Letters Patent is hereby corrected as shown below:

Title page,
Item [75], in the Inventor Section: "Satyanarayana" insert -- D.V --.

Column 1,
Line 45, "trimesters" should read -- tri-esters --.

Signed and Sealed this

Ninth Day of October, 2001

Attest:

NICHOLAS P. GODICI
Attesting Officer    Acting Director of the United States Patent and Trademark Office